Jan 6, 1931.　　　　　F. HAYES　　　　　1,787,746
MEANS FOR CRACKING NUTS
Filed Jan. 30, 1928　　　2 Sheets-Sheet 1
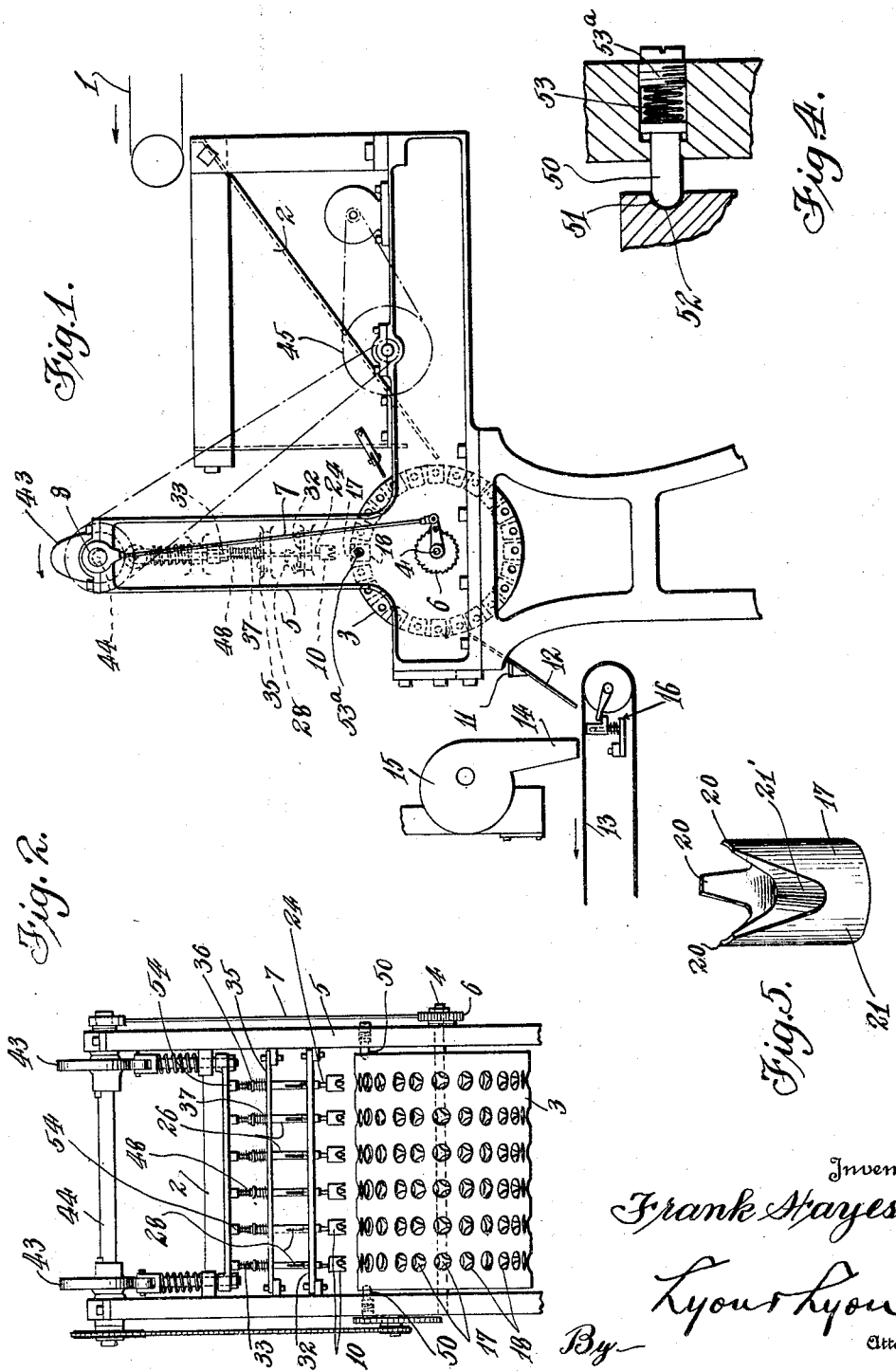
Inventor
Frank Hayes
By Lyon & Lyon
Attorneys

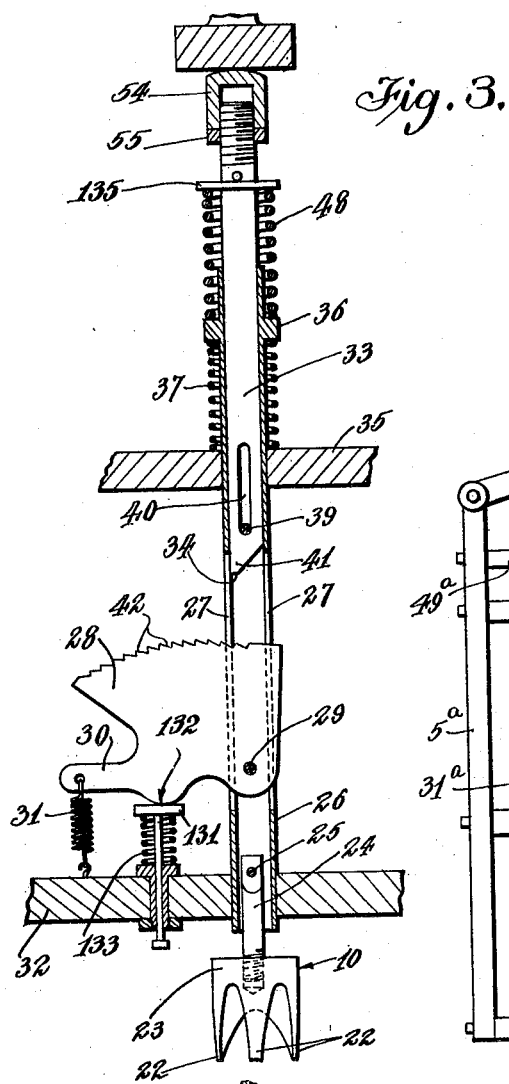
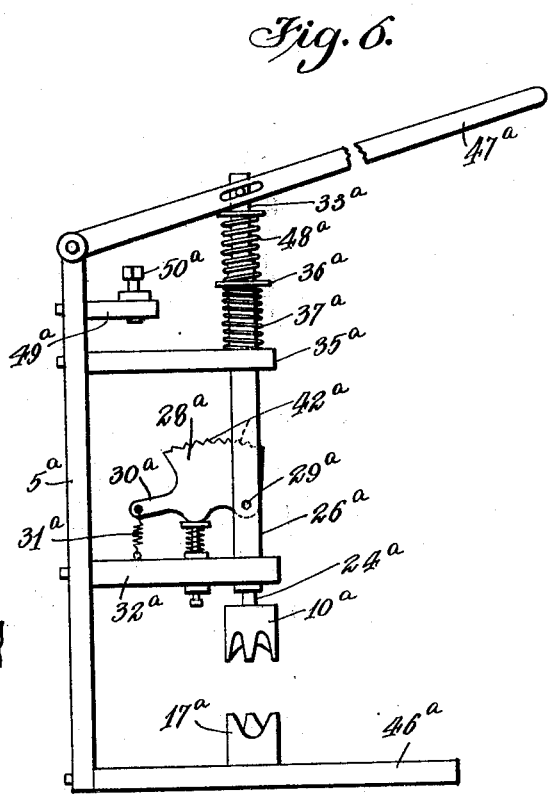
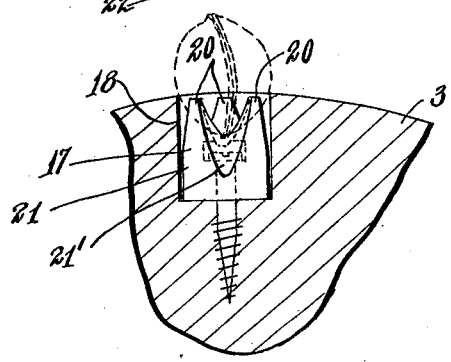

Patented Jan. 6, 1931

1,787,746

UNITED STATES PATENT OFFICE

FRANK HAYES, OF EL MONTE, CALIFORNIA

MEANS FOR CRACKING NUTS

Application filed January 30, 1928. Serial No. 250,572.

This invention relates to a method of and means for cracking nuts, and is more particularly related to a method and means of cracking or fracturing the shells of nuts, and feeding the nuts to the cracking means and for delivering the nuts with their cracked shells from the cracking means in a manner to cause the cracked shells to split away from the meat of the nuts.

Many forms of nut crackers have heretofore been devised, but applicant is unaware of there being provided heretofore an automatic nut cracking machine to which nuts could be fed in a manner to position the nuts relative to a cracker cracking the nuts positioned in a manner to fracture the shell of the nut without substantial damage to the meat or kernel thereof, and then delivering the nut from the cracking means in a manner to cause the fractured or split shell to fall away from the meat or kernel. Many crackers are now in use which are employed for the cracking of a large quantity of nuts, particularly walnuts, but these crackers are not entirely satisfactory in that they mutilate too great a portion of the meat or kernel of the nut and do not operate to fracture or split the shells of the nuts in a manner to permit the shells of all of the nuts to be broken away from the meat thereof. The percentage of successful cracks of the shell is not high in these machines heretofore provided.

An object of this invention is to provide a method of cracking nuts including the feeding of the nuts to a position in which the nuts are held stationary, imparting a quick sharp blow to said nuts, and feeding the nuts from the said position to permit the same to drop causing the nut shell to separate from the nut meats.

Another object of this invention is to provide a method of cracking nuts including the feeding of nuts to a cracker cup, imparting a quick blow to said nut in the cup, and permitting the cracked nut to drop from the cup to strike a surface, causing the shell to separate away from the meat of the nut.

Another object of this invention is to provide a means for automatically cracking nuts including a chute, a cracker, means for conveying the nuts from the chute in single file relation to the cracker, and means for imparting a sudden sharp blow to the nuts in said conveying means.

Another object of this invention is to provide a cracker unit adapted to be employed either in an automatic nut cracking machine or adapted to be used in a hand cracking machine, which includes a pair of cracking members, one constituting a holding device and the other a cracker, means for automatically adjusting the position of the cracker relative to the holder in accordance with the size of the nut, and means for imparting a sudden quick blow through the automatic regulating means and cracker to said nut.

Other objects and advantages of this invention, it is believed, will be apparent from the following detailed description of a preferred embodiment of this invention as illustrated in the accompanying drawings.

In the drawings:

Figure 1 is a side elevation of an automatic nut cracker embodying this invention.

Figure 2 is a front elevation thereof.

Figure 3 is a detached enlarged fragmental view of a single cracker unit embodying this invention.

Figure 4 is an enlarged fragmental sectional detail view of means to hold the supporting cylinder stationary.

Figure 5 is a perspective view of one of the complementary cracker members embodied in this invention.

Figure 6 is a side elevation of a hand nut cracker embodying this invention.

I have found that nuts, particularly walnuts, may be successfully cracked with a very high percentage of successful crackings of the shells without substantial mutilation of the nut meats if the nuts are fed in single file relation to a holder member which also constitutes one part of a pair of complementary cracking dies, imparting a sharp blow to the nut positioned between said pair of cracker members after the cracker members have been adjusted to the size of said nut, and also that the shell of the nut may be caused to separate from the meat thereof by permitting the nut and shell to fall from between said complementary cracker members to strike a surface, leaving the nut meat separated from the fractured shell in such a manner that the meats may be separated from the shell by any well known methods such, for example, as imparting a suction to the mixture of nut meats and shells, to cause the nutshells to be drawn or sucked away from said meats.

In the accompanying drawings, I have illustrated means for carrying out the method embodying this invention as set forth in the preceding paragraph, and which includes a conveyor 1 into which the nuts to be cracked may be fed from any suitable form of hopper (not shown). The nuts leaving the conveyor 1 pass onto an inclined chute 2. The nuts are delivered from the chute 2 to a cylinder 3 formed to provide a plurality of rows of cup cracker members of a construction which will hereinafter be particularly set forth. The cylinder 3 is secured to a shaft 4 mounted in a frame 5.

The cups of the cylinder 3 pick up the nuts and one nut will be positioned within each of said cracker cups.

The cylinder 3 is driven intermittently by any suitable form of means such, for example, as through a drive pawl and ratchet 6 connected with the pitman 7 of an eccentric 8. The nuts are brought to rest in position for a moment to permit a sharp quick blow to be imparted thereto through the cracker members 10. The moment of rest of the nuts under the cracker members 10 is extremely short and in all probability it would be possible to drive the cylinder 3 continuously without causing the same to come to rest if the cracker member is driven at a rapid enough rate.

The nuts having been cracked by the cracker member 10 in the cups of the cylinder 3 are dropped from the cups of the cylinder 3 onto a surface 11 which may be either a small flat surface or may be an inclined surface of a chute 12 through which the nuts are fed to a conveyor 13 on which the shells are separated from the meats of the nuts. The dropping of the nuts with their shattered or fractured shells onto the surface 11 causes the fractured shells to split away from the meats, enabling the cracked shells to be removed from the meats by conveying the cracked nuts on the conveyor 13 under a suction throat 14 which is connected with a suction fan 15. The conveyor 13 may, if desired, be given a bumping action to bump the nuts and fractured shells up and down on the surface thereof, as they are caused to travel along the conveyor 13 under the suction throat 14, to aid the suction in separating the shells from the meats. Any suitable form of bumping means may be provided for bumping the conveyor 13, such for example as is illustrated at 16. Any other form of separating means may be provided for separating the shells from the nut meats and, if desired, the shells may be separated from the nut meats by hand picking.

The complementary cracking members embodied in this invention are preferably of the following construction. The cups 17 which are held by the cylinder 3 are preferably mounted in recesses 18 formed in the periphery of the cylinder 3. The cup members 17 each include three upwardly extending prongs 20, which are formed integral with a base portion 21. The outer periphery of the base 21 is cut away, as illustrated at 21'. The cracker members 10 which form the other member of the complementary cracking means embodied in this invention are of the same construction as the cups 17, and likewise include three prongs 22 which extend from the base 23. The cracker members 10 are held in position so that their prongs 22 fit between the prongs 20 of the cups 17, forming a six-point engagement of the nut between the prongs 20 and 22 of the members 10 and 17, respectively. When a sharp blow is imparted to the cracker members 10 after the same have been adjusted to a position to accommodate the size of the particular nuts positioned between the cracker members 10 and their complementary cups 17, the nut shell is fractured at the six points of engagement. The shell being fractured at such a multiplicity of points will easily separate from the nut meat when the same is dropped a short distance and permitted to engage a surface which will jar the cracked shell and nut meats to cause the shell to split away from the nut meat.

In order to accommodate nuts of different sizes between the members 10 and 17, and to adjust the members 17 in position relative to the members 10 so that each of the nuts will receive the proper impulse to crack the shells of the nuts without shattering the meat of the nut, but of sufficient force to crack the shell at the six points of contact, so that the shell will fall away from the nut meats, the following means are preferably provided: The cracker member 10 is secured to a rod 24 and the rod 24 is pivotally supported at a pin 25 on a sleeve 26. The pivotal supporting of the cracker member 10 permits the cracker member 10 to adjust itself so that each of its prongs 22 engages the periphery of the nut, irrespective of the position of the nut in the cup 17. This likewise permits the nut to be engaged with the inner periphery of each of the prongs 20 of the cup 17, insuring an even six point contact of the nut with the prongs 20 and 22. The sleeve 26 is slotted, as illustrated at 27, to receive an automatically operating adjusting link 28. The adjusting link 28 is pivotally supported within the sleeve 26 at a pin 29. In order to balance the link 28 and insure even operation of the link, a spring 31 is provided which is secured to the extension 30 of the link 28 at one end and to the support 32 at the other end. The spring 31 yieldably urges the link 28 to rotate to the position to accommodate the largest size nut between the members 10 and 17. In order to cause the link 28 to rotate on the pin 29 to adjust the position of the member 10 relative to the cup 17, a rest block 131 is provided, which engages the curved edge 132 of the link 28 to hold this point of the link 28 from moving vertically as the sleeve 26 moves downward to cause the link 28 to rotate around the point of contact of the link 28 with the block 131. A spring 133 yieldably urges the block 131 into contacting position and the spring 133 is stronger than the spring 31. The spring 133 is also for the purpose of allowing the link 28 to move downwardly during the cracking movement of the cup member 10.

The movement of the sleeve 26 downwardly is effected in any suitable or desirable manner, as will hereinafter be specifically described, and the sleeve 26 carries a plunger 33 which engages the link 28 after the same has been rotated to adjust the position of the member 10. The plunger 33 is mounted within the sleeve 26 on a pin 39, which passes through an elongated slot 40 formed through the plunger 33. The plunger 33 is provided at its lower end with a pawl end 41 providing a point contact 34 which engages the teeth 42 formed along the upper edge of the link 28. The sleeve 26 is provided with a collar 36 which engages a spring 37 which is mounted between the collar 36 and a guide 35, through which said sleeve extends. The spring 37 yieldably urges the sleeve 26 upwardly to move the member 10 away from the cup 17. A spring 48 engages the opposite side of the collar 36 and is mounted around the plunger 33. The spring 48 engages a stop member 135 mounted on the plunger 33. The spring 48 is of greater strength than the spring 37, thereby holding the plunger 33 from movement relative to the sleeve 26 until movement of the sleeve 26 is prevented by the member 10 engaging the nut mounted within the cup 17. The plunger 33 then moves until the point 34 engages in the proper tooth 42 and a solid connection is then provided between the plunger 33 and the cracker member 10.

Any suitable or desirable form of means may be provided for imparting a quick sharp impulse to the plunger 33, and in the automatic machine illustrated in Figs. 1 and 2, a plurality of cracker units including plungers 33, adjusting links 28, and accompanying parts, are provided. The sharp impulse is imparted to the plunger 33 in this machine by means of a cam 43 which is mounted on a shaft 44 driven from any suitable source. The driving means are diagrammatically illustrated at 45.

Means are provided for holding the cylinder 3 stationary to position the cups 17 accurately under the cracker members 10, which means may be of any suitable or desirable construction, and are herein illustrated as comprising plungers 50 having rounded ends 51 which are adapted to pass into semi-spherical recesses 52 formed in the ends of the cylinders 3. The plungers 50 are urged into position by means of springs 53. Caps 53a are screw-threaded in the cylinder 3 in a manner to permit the adjustment of pressure exerted by the springs 53 on the ends of the plungers 50.

Means are also provided for adjusting the stroke of the cracker members 10, which means preferably comprise caps 54 which are screw-threaded to the ends of the rods 33. Lock nuts 55 are also screw-threaded on the rods 33 in position to engage the caps 54 to lock the same in adjusted position.

In the nut cracker illustrated in Figure 5, the construction is entirely similar to that heretofore described in connection with the automatic machine, so that the similar parts are designated with the same numerals with the addition of an exponent $a$. The cup member 17a is held stationary on a support 46a. The means for actuating the plunger 33a includes an actuating lever 47a which is pivotally mounted and is also pivotally secured to the plunger 33a. Interposed between the actuating lever 47a and the collar 36a is a spring 48a which normally acts to raise the operating member 47a. A bracket 49a is secured in position and is provided with an adjustable stop member 50a which acts to engage the end of the operating lever 47a to prevent the same being drawn too far down. The drawing of the operating lever 47a too far downwardly would cause the nut meats to be crushed and mutilated between the cracker member 10a and cup 17a.

Having fully described my invention, it is to be understood that I do not wish to be limited to the details herein set forth, but my invention is of the full scope of the appended claims.

I claim:

1. A device for cracking nuts which includes a cracker cup, a complementary cracker member, means for imparting a sharp blow to the cracker cup, and means for adjusting the position of the cracker member relative to the cracker cup before the blow-imparting means is actuated.

2. In a device of the class described, the combination of a cracker cup, a cracker member, means for freely supporting the cracker member relative to the cracker cup, a floater mounted in the supporting means, a plunger mounted in the supporting means and adapted to engage the floater to determine the position of the cracker member relative to the cracker cup and for maintaining a definite movement of the cracker member relative to the cracker cup, and means for imparting a sharp blow to the supporting means to crack the nut mounted between the cracker member and cracker cup.

3. In a nut cracking machine, the combination of a cracker cup providing three upstanding prongs, a complementary cracking member likewise providing three prongs, means holding said cracker members in position so that their prongs interfit, and means for pivotally supporting one of said cracker members.

4. In a device of the class described, the combination of a cracker cup, a cracker member, means for pivotally supporting the cracker member relative to the cracker cup, means for imparting a sharp blow to the cracker member, and means for automatically determining the length of the stroke of the cracker member relative to the cracker cup, said means being mounted intermediate the blow-imparting means and the cracker member.

5. In a device of the class described, the combination of a cracker cup, a cracker member, a tubular member, means for pivotally supporting the cracker member from the tubular member, a plunger mounted within the tubular member, a floater pivotally mounted within the tubular member in position to be engaged by the plunger to determine the length of stroke of the plunger irrespective of the size of the nut interposed between the cracker cup and cracker member, and means for actuating the plunger to impart a quick blow to the nut interposed between the cracker cup and cracker member.

6. A device for cracking nuts which includes a cracker cup, a complementary cracker member, means for imparting a sharp blow to the cracker cup, and means for adjusting the position of the cracker member relative to the cracker cup irrespective of the size of the nut within the cracker cup to contact the cracker member with the nut in the cup prior to the actuation of the means for imparting a sharp blow to the cracker cup.

7. A device for cracking nuts which includes a cracker cup, a complementary cracker member, means for imparting a sharp blow to the cracker member, and means interposed between the blow imparting means and the cracker member for automatically adjusting the position of the cracker member in relation to the cracker cup as the means for imparting a sharp blow to the cracker member is actuated and before the sharp blow is imparted to the cracker member.

8. In a device of the class described, the combination of a cracker member, a cracker cup, means for pivotally supporting the cracker member relative to the cracker cup, means for adjusting the position of the cracker member in relation to the cracker cup determined by the size of the nut held in the cracker cup, and means for imparting a definite predetermined stroke to the cracker member relative to the cracker cup to crack the shell of the nut mounted between the cracker member and the cracker cup.

Signed at El Monte, Calif., this 23rd day of January, 1928.

FRANK HAYES.